United States Patent [19]

Fetzer et al.

[11] Patent Number: 6,153,162
[45] Date of Patent: Nov. 28, 2000

[54] METHOD FOR THE REDUCTION OF NITROGEN OXIDES

[75] Inventors: Thomas Fetzer, Speyer; Bernd Morsbach, Ludwigshafen; Otto Kumberger, Mannheim; Martin Hartweg, Erbach; Rolf-Dirc Roitzheim, Dornstadt; Andrea Seibold, Blaustein; Leonhard Walz, Rastatt, all of Germany

[73] Assignees: BASF Aktiengesellschaft; Daimler Benz Aktiengesellschaft, both of Germany

[21] Appl. No.: 09/331,059

[22] PCT Filed: Dec. 17, 1997

[86] PCT No.: PCT/EP97/07091

§ 371 Date: Jun. 16, 1999

§ 102(e) Date: Jun. 16, 1999

[87] PCT Pub. No.: WO98/26858

PCT Pub. Date: Jun. 25, 1998

[30] Foreign Application Priority Data

Dec. 19, 1996 [DE] Germany .................. 196 53 200

[51] Int. Cl.[7] .............. B01J 8/00; B01J 23/00; B01J 23/32; B01J 23/48; B01J 23/02
[52] U.S. Cl. ............ 423/239.1; 423/212; 423/213.2; 502/305; 502/306; 502/307; 502/314; 502/318; 502/319; 502/320; 502/323; 502/342; 502/346; 502/347; 502/348; 502/355; 502/524
[58] Field of Search ................ 423/212, 213.2, 423/239.1; 502/305, 306, 307, 308, 309, 310, 311, 312, 314, 315, 316, 317, 318, 319, 320, 323, 324, 347, 524, 345, 342, 348, 355

[56] References Cited

U.S. PATENT DOCUMENTS 3,974,255  8/1976  Erickson et al. .............. 423/212
5,580,534  12/1996  Hartweg et al. .............. 423/239
5,750,460  5/1998  Hartweg et al. .............. 502/342

FOREIGN PATENT DOCUMENTS

| | | |
|---|---|---|
| 362960 | 4/1990 | European Pat. Off. . |
| 494388 | 7/1992 | European Pat. Off. . |
| 685253 | 12/1995 | European Pat. Off. . |
| 687499 | 12/1995 | European Pat. Off. . |
| 791390 | 8/1997 | European Pat. Off. . |
| 824648 | 1/1996 | Japan . |
| 94/02244 | 2/1994 | WIPO . |

*Primary Examiner*—Tom Dunn
*Assistant Examiner*—Maribel Medina
*Attorney, Agent, or Firm*—Keil & Weinkauf

[57] ABSTRACT

A process for the catalytic reduction of $NO_x$, the reduction taking place in the presence of a catalyst which comprises (a) from 20 to 97 wt % of $A_2O_3$, (b) from 1 to 40 wt % of CuO, (c) from 1 to 50 wt % of ZnO, (d) from 1 to 40 wt % of Ag, (e) from 0 to 2 wt % of Pt, (f) from 0 to 20 wt % of oxides of rare earth metals, elements of the 3rd subgroup of the Periodic Table of the Elements or mixtures thereof, based on the total weight of the components (a) to (e), which adds up to 100 wt %, wherein, in each case, up to half the weight of the component (a) may be replaced by $Fe_2O_3$, $Cr_2O_3$, $Ga_2O_3$ or mixtures thereof, of the component (b) by CoO, of the component (c) by MgO, of the component (d) by Au and of the component (e) by Pd, Ru, Os, Ir, Rh, Re or mixtures thereof, is used for reducing $NO_x$, especially in combustion off-gases, the components (a), (b) and (c) forming a spinel which is doped with the components (d), (e) and (f).

7 Claims, No Drawings

METHOD FOR THE REDUCTION OF NITROGEN OXIDES

The invention relates to the use of certain catalysts for reducing nitrogen oxides ($NO_x$) and to a corresponding process. Nitrogen oxides primarily come from combustion off-gases, in particular from internal-combustion engines such as diesel engines.

The combustion of hydrocarbons with air as an oxidant gives rise, particularly with excess air and at high temperatures, to nitrogen oxides via oxidation of the nitrogen present in the air. Examples of such nitrogen oxides are NO, $NO_2$, $NO_3$, $N_2O_3$, $N_2O_4$ and $N_2O_5$. Being pollutants, the nitrogen oxides are to be removed as completely as possible from the combustion off-gases, to avoid environmental pollution. While emissions from power stations and industry are progressively declining, owing to the use of off-gas treatment plants, abating the pollutant fraction in motor vehicle exhaust gases is becoming increasingly important, particularly given the increase in the number of motor vehicles.

Many solutions have been proposed for abating $NO_x$ emissions of motor vehicle engines. Effective solutions for abating the amounts of $NO_x$ must meet numerous criteria, particularly if catalysts are used, for example:

High conversion ratio, ie. extensive removal of $NO_x$, even at high and low temperature and in the event of frequent load changes during operation Avoiding the use of auxiliary materials such as ammonia or urea Low production and operating costs Long on-stream time Low $N_2O$ production High mechanical catalyst stability A number of catalysts for reducing nitrogen oxides have been proposed.

EP-A1-0 687 499 describes spinel catalysts made of a spinel comprising copper, zinc and aluminum, for reducing nitrogen oxides.

U.S. Pat. No. 3,974,255 describes a magnesium aluminate spinel catalyst coated with platinum. The catalyst is employed for reducing $NO_x$ in exhaust gases from internal-combustion engines.

EP-B1-0 494 388 describes a process for removing nitrogen oxides from an off-gas in which the catalyst used is a polyvalent metal phosphate, a polyvalent metal sulfate or a spinel aluminate of a transition metal of the 4th period of the Periodic Table of the Elements. In particular, a cobalt aluminate catalyst is described which is prepared by coprecipitation of cobalt nitrate and aluminum nitrate, followed by drying and calcination.

JP-A2-08024648 describes catalysts for removing nitrogen oxides from an off-gas. The catalyst, for example, has the composition $Ag_{0.01}P_{0.01}Pr_{0.01}Cu_{0.2}Zn_{0.5}Al_{2.0}$, and $Fe_{0.02}Co_{0.02}$ or 0.01% of MgO may also be present. The catalyst is prepared by the nitrates of Ag and Pr being mixed together with $H_3PO_4$ and this mixture being introduced into oxide mixtures of Cu, Zn and Al in the presence of aqueous solutions of ammonia or ammonium carbonate or ammonium sulfate. The calcination is carried out at 500° C. and 800° C., respectively. The silver content of the catalysts is 0.67 wt %.

Also known are catalysts for the catalytic decomposition of dinitrogen monoxide ($N_2O$). DE-A1-42 24 881 describes a silver-containing aluminum oxide supported catalyst and a process for the catalytic decomposition of dinitrogen monoxide, either pure or present in gas mixtures, where dinitrogen monoxide is decomposed selectively without other nitrogen oxides being decomposed to a significant extent into the elements. The catalyst used may be in the form of copper/zinc/aluminum spinels which are doped with silver. This involves, for example, an aluminum oxide support being impregnated with a solution of copper nitrate and zinc nitrate, being dried, calcined and then being impregnated with a solution of silver nitrate, being dried and calcined.

It is an object of the present invention to provide improved catalysts, compared with known catalysts, for reducing $NO_x$. In addition, a process for reducing $NO_x$, particularly in exhaust gases from internal-combustion engines, is to be provided.

We have found that this object is achieved, according to the invention, by the use of a catalyst which comprises (a) from 20 to 97 wt % of $Al_2O_3$,
(b) from 1 to 40 wt % of CuO,
(c) from 1 to 50 wt % of ZnO,
(d) from 1 to 40 wt % of Ag,
(e) from 0 to 2 wt % of Pt,
(f) from 0 to 20 wt % of oxides of rare earth metals, elements of the 3rd subgroup of the Periodic Table of the Elements or mixtures thereof, based on the total weight of the components (a) to (e), which adds up to 100 wt %, wherein, in each case, up to half the weight of the component (a) may be replaced by $Fe_2O_3$, $Cr_2O_3$, $Ga_2O_3$ or mixtures thereof, of the component (b) by CoO, of the component (c) by MgO, of the component (d) by Au and of the component (e) by Pd, Ru, Os, Ir, Rh, Re or mixtures thereof, for reducing $NO_x$.

At the same time it was found, according to the invention, that catalysts as described in DE-A1-42 24 881 can be employed for reducing $NO_x$.

In this context, the catalysts used according to the invention preferably comprise from 30 to 80, particularly preferably from 40 to 75, in particular from 45 to 65 wt % of $Al_2O_3$, preferably from 3 to 35, particularly preferably from 5 to 30, in particular from 8 to 25 wt % of CuO, preferably from 2 to 40, particularly preferably from 5 to 30, in particular from 10 to 26 wt % of ZnO, preferably from 2 to 35, particularly preferably from 3 to 30, in particular from 5 to 25 wt % of Ag and preferably from 0 to 1, particularly preferably from 0 to 0.5, in particular from 0 to 0.1 wt % of Pt. As described above, the specified weights are based on the total weight of the components (a) to (e), which adds up to 100 wt %.

Preferably, in each case, at most ⅓ particularly preferably at most ⅕, in particular ¹⁄₁₀ of the weight of the components (a),(b),(c),(d) and/or (e) are replaced as described above. Preferably, none of the components (a),(b),(c),(d) and (e) is replaced.

Eligible for component (f) are oxides of the rare earth metals and the elements of the 3rd subgroup of the Periodic Table of the Elements, preferably oxides of 3-valent rare earth metals, in particular La and/or Ce. Preferably, Pr is not present in the catalyst.

Component (f) is preferably employed in amounts of from 0 to 15, particularly preferably from 0 to 10, in particular from 0 to 5 wt %, based on the total weight of the components (a) to (e). Preferably, no component (f) is present.

Particularly preferably, the catalyst consists of the components (a) to (e), specifically only of $Al_2O_3$, CuO, ZnO, Ag and possibly Pt.

According to the invention a copper/zinc/aluminum oxide compound is used which can be generally represented as follows: $Cu_aZn_bAl_2O_{3+a+b}$, where a>0, b>0, a+b≦1.

Preferably, the components (a), (b) and (c) form a spinel. Spinels are described, for example, in C. W. Correns, Einführung in die Mineralogie [Introduction to mineralogy], Springer Verlag 1949, pp. 77–80, H. Remy, Lehrbuch der Anorganischen Chemie [Textbook of inorganic chemistry], Akademische Verlagsgesellschaft Geest & Portig K.-G. Leipzig 1950, pp. 308–311, Römp, Chemielexikon, 9th edition 1995, p. 4245. Spinels formally derive from $MgAl_2O_4$, where magnesium may be replaced by other divalent ions such as zinc, copper, iron. Aluminum may be replaced by other trivalent ions such as iron or chromium. In the spinel lattice the oxygen atoms form a cubic close-packed structure corresponding to a face-centered lattice. Half of the octahedral vacancies therein are occupied by aluminum, the other half of the vacancies are empty. One eighth of the tetrahedral vacancies are occupied by magnesium.

What is preferably present is essentially a copper/zinc spinel. For a+b=1 no vacant sites exist in the spinel lattice. $Al_2O_3$ can act as a matrix, in which the other metal oxides are present. This is the case, in particular, for a+b≦1.

The novel catalysts may contain small amounts of $SiO_2$, $TiO_2$, $ZrO_2$, talc and/or cements, as long as these do not significantly affect the properties of the catalysts. According to one embodiment the catalyst is phosphorus-free, particularly if Pr is present.

The novel catalysts have a pore volume of from 0.01 to 1, preferably from 0.01 to 0.8, particularly preferably from 0.1 to 0.7 ml/g, the pore size distribution being monomodal, bimodal or polymodal. Bimodal or polymodal catalysts in this context preferably have mesopores and macropores. Mesopores have a diameter of less than 50 nm, macropores have a diameter of from 50 to 10000 nm. The catalyst preferably has a bimodal or polymodal pore size distribution, from 40 to 99%, preferably from 50 to 98%, particularly preferably from 55 to 95% of the pore volume being present in mesopores and from 1 to 60%, preferably from 2 to 50%, particularly preferably from 5 to 45% of the pore volume being present in macropores. Particularly preferably the catalyst is bimodal.

Oligomodal catalysts may also contain pores having a diameter of more than 10000 nm, the fraction of these pores preferably being from 0.1 to 20, particularly preferably from 1 to 15% of the pore volume, where the above-specified values for the mesopores and macropores relate to the residual pore volume.

In the case of catalysts having a bimodal or polymodal pore size distribution, the major fraction of the pore volume is preferably within a pore size range of from 10 to 1000 nm.

The size of the silver particles present in the catalyst is preferably from 0.1 to 200, particularly preferably from 5 to 50 nm. Above 300° C. in this context, silver is present as a metal and below this temperature may also be present as an oxide. The weights specified above are based on the metal.

The pore volume and the pore volume distribution are preferably determined by Hg porosimetry. The size of the silver particles is determined, for example, by means of measuring the line width in X-ray diffraction.

The BET surface area is preferably from 1 to 200, particularly preferably from 20 to 150, in particular from 50 to 100 $m^2/g$.

The catalysts employed according to the invention may be present in any form, for example as pellets, tablets, which may be hollow or solid; granules having a diameter of preferably from 0.5 to 3 mm, chips, honeycombs, etc. The novel catalysts may also be present on other support materials such as glass fiber mats, ceramic or metallic supports, and the supports may have various shapes, for example corrugated or rolled. The above-specified quantities in this context relate to the catalyst proper, without the additional support. Catalysts used according to the invention which are to be employed in the automotive sector preferably are honeycomb-shaped, the hole diameter preferably being from 0.1 to 10 mm, in particular from 0.5 to 5 mm, and the web width preferably being from 0.1 to 5 mm, in particular from 0.3 to 3 mm.

The catalysts used according to the invention can be prepared by any suitable process. Suitable processes are described, for example, in DE-A1-42 24 881. For example, AlOOH (boehmite), CuO, ZnO and any further metal oxides required may be kneaded with water in the presence of a binder, extruded to form extrudates, dried and calcined. The catalyst base bodies thus prepared can be impregnated with an aqueous solution of silver nitrate. The impregnated catalysts are then dried and calcined.

Instead of metal oxides, the corresponding hydroxides, oxyhydrates, carbonates, salts of organic acids, nitrates, chlorides, sulfates or phosphates can be used. To prepare bimodal or polymodal catalysts it is possible to use, instead of AlOOH, a mixture of AlOOH and $Al_2O_3$, preferably γ- or δ-$Al_2O_3$, with the option of employing aluminum oxide ($Al_2O_3$) of different pore size distributions.

Drying preferably takes place at from 10 to 200° C., particularly preferably from 20 to 150° C., in particular from 30 to 120° C. Calcination takes place at less than 1100° C., preferably at from 600 to 900° C. Calcination after impregnation with silver nitrate solution preferably takes place at from 200 to 800° C.

The catalysts used according to the invention are preferably employed for reducing $NO_x$ in combustion off-gases. The reduction of the NO is effected by reaction with a reducing agent.

The invention also relates to a process for the catalytic reduction of $NO_x$ in mixtures containing $NO_x$, $O_2$ and hydrocarbon compounds, the reduction taking place in the presence of a catalyst as defined above, and the hydrocarbon compounds serving as reducing agents.

The mixture is preferably a combustion off-gas, the combustion off-gas in particular coming from internal-combustion motors or internal-combustion engines.

Such an off-gas inter alia contains nitrogen oxides ($NO_x$), oxygen ($O_2$), water vapor and possibly hydrocarbon compounds. Hydrocarbon compounds are, for example, oxygen-containing hydrocarbon compounds such as alcohols, ethers, aldehydes, ketones, epoxides etc. The term "hydrocarbon compounds" also subsumes hydrocarbons such as alkanes, alkenes, alkynes or aromatic compounds. Instead of the hydrocarbon compounds it is also possible to use CO or $H_2$. Preference is given to the use of added hydrocarbon compounds. For example, short-chain hydrocarbons such as propene may be metered into the off-gas stream. Another preferred option is for a portion of the fuel, for example in the case of a motor vehicle, to be supplied to the off-gas stream, so that hydrocarbon compounds are present in the off-gas. An example of a reaction taking place if propene is used as the hydrocarbon compound is shown in the following reaction equation.

$$4\ NO_2+NO+CH_3-CH=CH_2 \rightarrow 5/2\ N_2+3\ CO_2+3\ H_2O$$

Diesel exhaust gases, in particular, additionally contain oxygen, since the combustion is carried out with excess air. This means that further reactions may take place in which organic oxygen-containing compounds are formed.

Hydrocarbon compounds present can therefore, on the one hand, react with oxygen present and, on the other hand, with nitrogen oxides present, the catalyst used according to the invention preferentially catalyzing the reaction of hydrocarbons with $NO_x$, compared with the reaction of hydrocarbons with oxygen.

Exhaust gases, in particular of diesel engines, in addition to $NO_x$ and hydrocarbons also contain CO, possibly soot, $SO_2$, and water vapor, oxygen, nitrogen ($N_2$) and $CO_2$. A diesel exhaust gas can have the following composition:

$NO_x$ from 10 to 10000, on average 2000 ppm hydrocarbons from 10 to 2000, on average 200 ppm CO from 10 to 4000, on average 100 ppm soot from 0 to 1, on average 0.3 g/l sulfur dioxide from 0 to 200, on average 40 ppm water vapor from 1.5 to 8, on average 7 vol % oxygen from 3 to 18, on average 4 vol %

$CO_2$ from 2 to 15, on average 3 vol %

Typical catalyst loadings are from 20,000 to 30,000, peak loadings up to 100,000 m³ (s.t.p.) of gas per m³ of catalyst per hour. The invention is explained below in more detail with reference to examples.

General preparation procedure for the catalyst

The catalyst used according to the invention can be prepared in a manner similar to the procedure described in DE-A1-42 24 881.

This, for example, involves 400 g of AlOOH (Boehmite, Pural® SB from Condea), 50 g of CuO, 154.5 g of ZnO and 25 g of methylcellulose (Walocel® from Wolff, Walsrode) being kneaded with 270 g of water for one hour, being extruded to produce solid extrudates having a diameter of 3 mm and a length of 8 mm, dried and calcined for 4 hours at 800° C. The material obtained after calcination has a surface area of 54 m²/g. The porosity is 0.32 ml/g.

The inorganic constituents have the following composition: Cu: 0.63 mol (CuO: 10 wt %), Zn: 1.90 mol (ZnO: 28 wt %), Al: 6.67 mol (Al₂O₃: 62 wt %). This corresponds to the empirical formula $Cu_{0.2}Zn_{0.6}Al_2O_{3.8}$.

108 g of this material (spinel) are impregnated with 51 ml of an aqueous solution containing 30.2 g of silver nitrate and are left for one hour. The impregnated material is dried for one hour at 120° C. to constant weight and then calcined at 600° C. The catalyst pellets thus obtained contain 19.2 g of metallic silver, corresponding to 17.8 wt %.

In the following examples percentages relate to weight unless otherwise stated.

EXAMPLE 1

Monomodal catalyst having the composition 20% of CuO, 20% of ZnO, 45% of Al₂O₃, 15% of Ag 400 g of AlOOH (Boehmite, Pural SB from Condea), 151 g of CuO and 151 g of ZnO as well as 30 g of methylcellulose (Walocel from Wolff, Walsrode) were kneaded with 320 g of water for one hour, extruded to produce solid extrudates having a diameter of 3 mm and a length of 8 mm, dried and calcined for 4 hours at 800° C.

640 g of this spinel body were impregnated with 178 g of silver nitrate in the form of an aqueous 50% strength AgNO₃ solution. This was followed by drying for one hour at 120° C. and calcination for 4 hours at 600° C.

The pellets thus obtained contained 15% of Ag, 20% of CuO, 20% of ZnO and 45% of Al₂O₃. They were monomodal and contained pores, 95% of which had a diameter of 50–50000 nm. The total porosity was 0.32 ml/g.

EXAMPLE 2

Bimodal catalyst with 5% of Ag, 15% of CuO, 19% of ZnO, 61% of Al₂O₃

The bimodal catalyst was obtained by a mixture of AlOOH and Al₂O₃ being used instead of just AlOOH.

611 g of Cu(NO₃)₂×3 H₂O, 581 g of Puralox® SCF-A 230 (Al₂O₃, produced by Condea) and 322 g of Pural SB (AlOOH, produced by Condea) were mixed well for 3 hours. The dry composition was then admixed with enough water to produce a plastic kneading composition. 45 g of formic acid were then introduced. The composition was kneaded for 70 minutes, formed into extrudates, dried for 16 hours at 120° C. and calcined for 4 hours at 800° C.

800 g of the body thus obtained were impregnated with 373 g of Zn(NO₃)₂×6 H₂O, which had been dissolved in water and was made up to 400 l of total solution.

After 1.5 hours' impregnation, drying took place for 16 hours at 120° C., followed by calcination for 4 hours at 600° C.

As described in Example 1, the catalyst was impregnated with a 50% strength AgNO₃ solution, so that the finished catalyst contained 5% of silver. The catalyst had the composition 5% of Ag, 19% of ZnO, 15% of CuO, 61% of Al₂O₃. The BET surface area was about 100 m²/g. The water uptake was about 0.5 ml/g, which corresponded to an overall porosity of the same magnitude.

EXAMPLE 3

The catalyst was prepared in a manner similar to that of Example 2, but had the following composition: 15% of Ag, 17% of ZnO, 13.6% of CuO, 54.4% of Al₂O₃.

EXAMPLE 4

The procedure from Example 2 was repeated, but the catalyst obtained had the following composition: 25% of Ag, 15% of ZnO, 12% of CuO, 46% of Al₂O₃.

EXAMPLE 5

The procedure from Example 2 was repeated, but the following composition was obtained: 15% of Ag, 17% of ZnO, 13.6% of CuO, 54.3% of Al₂O₃, 0.1% of Pt. Doping with Pt was effected by impregnation with an aqueous platinum nitrate solution. This impregnation took place at the same time as the impregnation with silver nitrate, but can also be carried out independently.

EXAMPLE 6

The catalyst was prepared in a manner similar to the procedure described in Example 2, but had the following composition: 15% of Ag, 25.5% of ZnO, 8.5% of CuO, 51% of Al₂O₃.

COMPARATIVE EXAMPLE 1

For comparative purposes a catalyst was prepared in a manner similar to that of Example 2, except that no silver was employed. The catalyst had the following composition: 15% of ZnO, 21.3% of CuO, 63.7% of $Al_2O_3$.

COMPARATIVE EXAMPLE 2

The comparative catalyst was prepared in a manner similar to that of Example 2, except that instead of silver a very small amount of palladium was employed. The catalyst had the following composition:
20% of ZnO, 16% of CuO, 64% of $Al_2O_3$, $0.1$% of Pd.

Study of the catalysts

The catalysts obtained were studied as follow:

Of the respective catalysts, 10 g of chippings of the fraction from 1.6 to 20 mm were introduced into a vertically positioned quartz reactor (diameter 20 mm, height about 500 mm) in the center of which a gas- permeable frit was arranged for accommodating the catalyst. The bed height was about 15 mm. Around the quartz reactor a furnace was arranged which heated the central section of the reactor over a length of 100 mm, temperatures up to 550° C. being achievable.

A gas mixture was passed through the catalyst at a flow rate of about wt 10000 (1 [s.t.p.] of gas)/(1 of cat x h). The gas mixture consisted of 1000 ppm of NO, 1000 ppm of propene, 10 vol % of oxygen and argon (remainder) as the carrier gas.

Downstream of the reactor the NO concentration was measured with a gas detector, any $NO_2$ formed upstream of the detection being reduced in a converter to NO. The reaction was carried out at temperatures in the range of from 200° C. to 400° C. The study results obtained are listed in the following table, including the $NO_x$ concentration measured downstream of the reactor and the minimum $NO_x$ concentration and the temperature at which the minimum $NO_x$ concentration had been measured. In addition the maximum conversion ratio is listed, ie. the ratio ($NO_x$ upstream) minus ($NO_x$ downstream) to ($NO_x$ upstream).

We claim:

1. A process for the catalytic reduction of $NO_x$, the reduction taking place in the presence of a catalyst which comprises
   (a) from 20 to 97 wt % of $Al_2O_3$,
   (b) from 1 to 40 wt % of CuO,
   (c) from 1 to 50 wt % of ZnO,
   (d) from 1 to 40 wt % of Ag,
   (e) from 0 to 2 wt % of Pt,
   (f) from 0 to 20 wt % of oxides of rare earth metals, elements of the 3rd subgroup of the Periodic Table of the Elements or mixtures thereof, based on the total weight of the components (a) to (e), which adds up to 100 wt %,
   wherein, in each case, up to half the weight of the component (a) may be replaced by $Fe_2O_3$, $Cr_2O_3$, $Ga_2O_3$ or mixtures thereof, of the component (b) by CoO, of the component (c) by MgO, of the component (d) by Au and of the component (e) by Pd, Ru, Os, Ir, Rh, Re or mixtures thereof, wherein the components (a), (b) and (c) form a spinel which is doped with the components (d), (e) and (f), wherein the catalyst has a bimodal or polymodal pore size distribution, 40–99% of the pore volume being present in mesopores and 1–60% of the pore volume being present in macropores.

2. The process as claimed in claim 1, wherein the pore volume of the catalyst is from 0.01 to 1 ml/g.

3. The process as claimed in claim 1, for reducing $NO_x$ in combustion off-gasses.

4. A process for the catalytic reduction of $NO_x$ in mixtures containing $NO_x$, $O_2$ and hydrocarbon compounds, the reduction taking place in the presence of a catalyst as defined in claim 1.

5. The process as claimed in claim 4, wherein the mixture is a combustion off-gas.

6. The process as claimed in claim 5, wherein the com-

TABLE

| Catalyst from Example No. | $NO_x$ upstream of reactor (ppm) | $NO_x$ downstream of reactor (ppm) | | | | | $NO_x$ min. downstream of reactor (ppm) | T (° C.) at $NO_x$ min. | Conversion ratio (%) max. |
|---|---|---|---|---|---|---|---|---|---|
| | | 200° C. | 250° C. | 300° C. | 350° C. | 400° C. | | | |
| 1 | 1000 | 620 | 400 | 305 | 390 | 705 | 300 | 295 | 70.0 |
| 2 | 1000 | 810 | 300 | 280 | 600 | 840 | 235 | 280 | 76.5 |
| 3 | 1000 | 945 | 480 | 195 | 365 | 540 | 190 | 295 | 81.0 |
| 4 | 1000 | 980 | 520 | 345 | 820 | 910 | 345 | 300 | 65.5 |
| 5 | 1000 | 885 | 575 | 495 | 725 | 860 | 485 | 285 | 51.5 |
| 6 | 1000 | 610 | 385 | 220 | 415 | 595 | 215 | 290 | 78.5 |
| Comparative Example 1 | 1000 | 800 | 605 | 580 | 615 | 685 | 575 | 280 | 42.5 |
| Comparative Example 2 | 1000 | 935 | 660 | 635 | 815 | 895 | 605 | 285 | 39.5 |

The results of the table demonstrate that the catalysts used according to the invention according to Examples 1–6 lead to considerably better abatement of $NO_x$ compared with the comparative catalysts according to Comparative Examples 1 and 2.

bustion off-gases come from internal-combustion motors or internal-combustion engines.

7. The process as claimed in claim 4, wherein hydrocarbon compounds, CO or $H_2$ serve as reducing agent(s).

* * * * *